May 29, 1945.  C. E. FISHER  2,376,995
FLEXIBLE JOINT
Filed April 30, 1943

INVENTOR.
CLARENCE E. FISHER
BY
George Douglas Jones
ATTORNEY

Patented May 29, 1945

2,376,995

UNITED STATES PATENT OFFICE 2,376,995

FLEXIBLE JOINT

Clarence E. Fisher, Baltimore, Md., assignor to The Glenn L. Martin Company, Middle River, Md., a corporation of Maryland Application April 30, 1943, Serial No. 485,149

5 Claims. (Cl. 285—11)

This invention relates to an improved flexible, fluid-tight joint. The particular joint is designed for use in engine exhaust ducts but can be used to advantage wherever it is necessary to have a flexible, fluid-tight joint in a duct.

In aircraft installations, it is common practice to utilize the engine exhaust to run the turbo-superchargers. The turbines are located close to the engine so the exhaust gases and ducts are at a very high temperature. It is necessary in such installation to provide flexible joints to allow for installation adjustments and expansions. At the same time the joint must be maintained fluid-tight because the efficiency of the turbine is dependent upon maintaining the pressure of the exhaust.

An object of this invention is to provide a joint allowing considerable relative movement and maintaining a high degree of sealing.

Another object is to provide a flexible joint capable of withstanding high temperatures.

A further object is the provision of a structure that can readily be assembled.

Further and other objects will become apparent from the description of the accompanying drawing which forms a part of this disclosure and in which like numerals refer to like parts.

Figure 1:
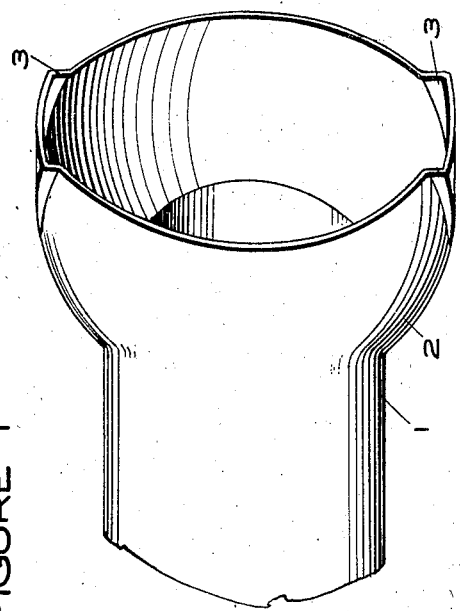
Figure 1 is a perspective view of the enlarged tube end.

The tube 1, of Figure 1, has an enlarged end 2, which is spun so that it forms a spherical shell. The open end of the formed portion is less than the maximum cross-section of the spherical portion. Diametrically opposite grooves 3 are formed with their bottoms substantially tangent to the inner spherical surface at a point of maximum diameter. These grooves are wide enough to permit the passage of the sealing ring 4 edgewise therethrough, to the center of the spherical shell.

Figure 2:
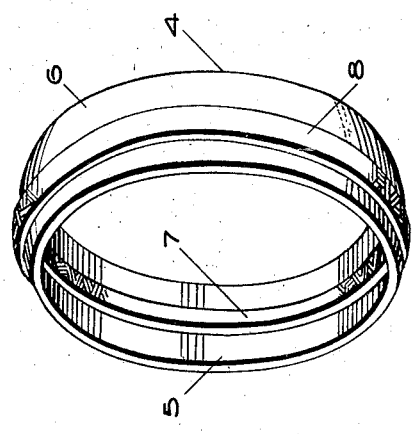
Figure 2 illustrates the ring and gasket assembly.

Ring 4, illustrated in Figure 2, has an internal cylindrical surface 5 and an external spherical surface 6. Sealing gaskets 7 and 8 are of heat resisting material and are located internally and externally of the ring. These gaskets are similar to the well-known "doughnut seal."

To assemble the joint, it is merely necessary to slide ring 4 edgewise through grooves 3 until the center of the spherical surface of the ring coincides with the center of the spherical shell. The ring can then be turned 90 degrees and will be retained by the shell. Tube 9 may then be inserted in the ring. Gasket 7 seals the space between the ring and tube 9 while allowing movement of the tube due to expansion of the assembly.

Figure 3:
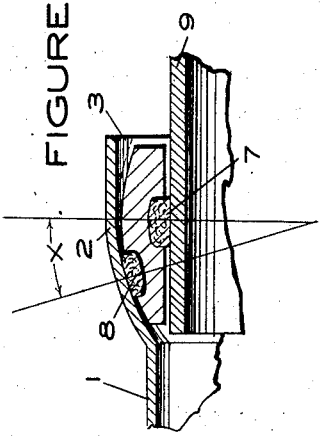
Figures 3 and 4 are fragmentary sectional views of the joint.
Figure 4:
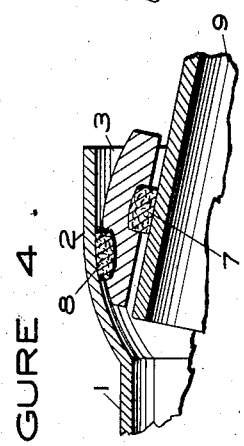

Gasket 8 is located on the ring between the centerline and the edge of the ring. The purpose of this location will be seen from an inspection of Figures 3 and 4. Figure 3 shows the normal in-line position of the tubes. Figure 4 shows the tubes out of line. It will be noted that due to the position of gasket 8, the seal between the spherical surfaces is maintained for a misalignment of the tubes equal to the angular displacement "X" of the gasket from the centerline of the ring. It is obvious that further swiveling of the joint would permit the escape of gases through one or the other of grooves 3.

It is to be understood that certain changes, alterations, modifications and substitutions can be made without departing from the spirit and scope of the appended claims.

I claim as my invention:

1. The combination, in a flexible ball-joint for tubes, of two tubes, one tube having a bell-end, the interior of which is shaped to a spherical contour, a ring having the external surface of similar spherical contour adapted to fit within and be retained by said bell-end, the other tube having a cylindrical end adapted to engage the internal cylindrical surface of said ring, said bell-end having diametrically opposite grooves substantially equal in width to the width of said ring, the bottom of said grooves extending parallel to the axis of said tube and tangent to the line of maximum diameter of said internal spherical surface, an anular sealing gasket carried by the ring, said annular gasket mounted on said ring between the edge thereof and the point of maximum diameter, on the opposite side of said line of maximum diameter from said grooves, and a second sealing gasket mounted in said ring, sealing the space between said ring and said second tube.

2. The combination, in a flexible ball-joint for tubes, of two tubes, one tube having a bell-end of spherical internal contour, a sealing ring adapted to join said tubes, formed externally with a similar spherical surface, a groove in said bell-end whereby the ring may be placed edgewise within the bell-end and turned to the operative position wherein it is retained by the fit of the similar spherical contours, annular sealing gaskets mounted internally and externally of said ring, said external annular gasket being of smaller diameter than the maximum diameter of said ring and positioned on the spherical surface intermediate the edge of the ring and the point of maximum diameter.

3. The combination, in a flexible ball-joint for tubes, of two tubes, one tube having a bell-end of spherical internal contour, a sealing ring adapted to join said tubes having an external spherical surface positioned within and retained by said bell-end, sealing means carried on the external and internal surfaces of said ring to seal the joint between the ring and said tubes, said sealing means comprising annular gaskets, said gasket on the external surface of said ring being located in a plane substantially parallel to the edge of the ring at a point intermediate the inner end thereof and the point of maximum diameter of said ring.

4. A fluid-pressure-tight structure forming a flexible joint between tubes comprising a first tube having an enlarged end, the internal surface of which having a spherical contour, a ring having an external spherical surface positioned within the said enlarged tube end and retained thereby, to support a second tube, an annular sealing gasket positioned between said tube end and said ring adjacent the inner edge thereof, whereby a seal is provided between the adjacent spherical surfaces.

5. In combination in a swiveling connection, of a ring having the external surface thereof of spherical contour, and a spherically formed receptacle surrounding and retaining said ring, grooves in the surface of said receptacle to permit the insertion of the ring to the point of maximum diameter, annular gasket means providing a seal for the space between the spherical surfaces, and gasket means secured to the periphery of said ring adjacent the inner edge thereof, whereby the gasket means effectively seals said space for an angle of swiveling of said second tube equal to the angular displacement of said annular gasket from the plane of maximum diameter of said ring.

CLARENCE E. FISHER.